(12) United States Patent
Lee et al.

(10) Patent No.: US 11,941,368 B2
(45) Date of Patent: *Mar. 26, 2024

(54) METHOD FOR PROVIDING TEXT TRANSLATION MANAGING DATA RELATED TO APPLICATION, AND ELECTRONIC DEVICE THEREOF

(71) Applicant: Samsung Electronics Co., Ltd., Gyeonggi-do (KR)

(72) Inventors: Sihyoung Lee, Gyeonggi-do (KR); Beomsu Kim, Gyeonggi-do (KR); Sunjung Kim, Gyeonggi-do (KR); Soowan Kim, Gyeonggi-do (KR); Jaehyun Kim, Gyeonggi-do (KR); Insun Song, Gyeonggi-do (KR); Hyunseok Lee, Gyeonggi-do (KR); Jihwan Choe, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

This patent is subject to a terminal disclaimer.

(21) Appl. No.: 17/207,822

(22) Filed: Mar. 22, 2021

(65) Prior Publication Data

US 2021/0209400 A1 Jul. 8, 2021

Related U.S. Application Data

(63) Continuation of application No. 16/284,047, filed on Feb. 25, 2019, now Pat. No. 10,956,767.

(30) Foreign Application Priority Data

Feb. 23, 2018 (KR) ........................ 10-2018-0022078

(51) Int. Cl.
*G06F 40/58* (2020.01)
*G06F 40/263* (2020.01)
(Continued)

(52) U.S. Cl.
CPC ............ *G06F 40/58* (2020.01); *G06F 40/263* (2020.01); *G06V 10/17* (2022.01); *G06V 20/20* (2022.01);
(Continued)

(58) Field of Classification Search
CPC .... G06V 30/153; G06V 10/17; G06V 10/255; G06V 20/20; G06V 20/62; G06V 20/63;
(Continued)

(56) References Cited

U.S. PATENT DOCUMENTS 9,442,923 B1 * 9/2016 Abou Mahmoud .. G06F 40/106
9,514,376 B2 12/2016 Cuthbert et al.
(Continued)

FOREIGN PATENT DOCUMENTS

KR 10-2014-0045573 A 4/2014
KR 10-2016-0118198 A 10/2016
(Continued)

OTHER PUBLICATIONS

European Search Report dated Sep. 30, 2021.
(Continued)

*Primary Examiner* — Jianxun Yang
(74) *Attorney, Agent, or Firm* — Cha & Reiter, LLC

(57) ABSTRACT

Certain embodiments of the disclosure relate to an apparatus and a method for translating a text included in an image by using an external electronic device in an electronic device. One method comprises displaying a picture comprising an object bearing text at a location within the picture on a display, extracting the text, generating another text from the extracted text, and automatically overlaying the another text on the object in another picture comprising the object at another location within the another picture on the display.

18 Claims, 16 Drawing Sheets

(51) Int. Cl.
  *G06V 10/10* (2022.01)
  *G06V 20/20* (2022.01)
  *G06V 20/62* (2022.01)
  *G06V 30/148* (2022.01)
  *H04N 5/14* (2006.01)

(52) U.S. Cl.
  CPC .............. *G06V 20/62* (2022.01); *G06V 20/63* (2022.01); *G06V 30/153* (2022.01); *H04N 5/144* (2013.01)

(58) Field of Classification Search
  CPC ...... G06V 30/10; G06V 10/40; G06F 40/263; G06F 40/58; H04N 5/144; G06T 11/60
  See application file for complete search history.

(56) References Cited

U.S. PATENT DOCUMENTS

| | | |
|---|---|---|
| 2010/0299134 A1 | 11/2010 | Lam |
| 2011/0090253 A1 | 4/2011 | Good |
| 2012/0088543 A1 | 4/2012 | Lindner et al. |
| 2012/0163668 A1* | 6/2012 | Englund .................. G06F 40/58 382/103 |
| 2013/0039537 A1 | 2/2013 | Yamazaki et al. |
| 2013/0279758 A1* | 10/2013 | Burry .................. G06V 30/1475 382/105 |
| 2015/0310291 A1 | 10/2015 | Cuthbert et al. |
| 2016/0301869 A1* | 10/2016 | Mitsunaga .............. G06F 40/42 |
| 2016/0371256 A1 | 12/2016 | Mauser et al. |
| 2017/0090693 A1 | 3/2017 | Ku et al. |

FOREIGN PATENT DOCUMENTS

| | | |
|---|---|---|
| KR | 10-2016-0147950 A | 12/2016 |
| WO | 2008/114104 A1 | 9/2008 |
| WO | 2014/162211 A2 | 10/2014 |

OTHER PUBLICATIONS

Summons to attend oral proceedings dated Jun. 13, 2022.
Indian Examination Report dated Jul. 2, 2022.
Korean Notice of Preliminary Rejection dated Aug. 24, 2022.
EP Minutes dated Nov. 24, 2022.
EP Decision to Refuse dated Dec. 23, 2022.
EP Preliminary Opinion dated Oct. 24, 2022.
European Search Report dated Mar. 23, 2023.
Korean Office Action dated Feb. 21, 2023.
Korean Office Action dated Jul. 19, 2023.
Korean Notice of Patent Grant dated Oct. 26, 2023.
European Office Action dated Nov. 29, 2023.

* cited by examiner

METHOD FOR PROVIDING TEXT TRANSLATION MANAGING DATA RELATED TO APPLICATION, AND ELECTRONIC DEVICE THEREOF

CROSS-REFERENCE TO RELATED APPLICATION(S)

This application is a Continuation of U.S. patent application Ser. No. 16/284,047 filed on Feb. 25, 2019, which claims priority under 35 U.S.C. § 119 to Korean Patent Application No. 10-2018-0022078, filed on Feb. 23, 2018, in the Korean Intellectual Property Office, the disclosure of which is herein incorporated by reference in its entirety.

BACKGROUND

Field

Certain embodiments of the disclosure relate to an apparatus and a method for providing a translation service of a text included in an image which is obtained through a camera in an electronic device.

Description of Related Art

With the enhancement of information and communication technology and semiconductor technology, various types of electronic devices are developing into multimedia devices providing various multimedia services. For example, the multimedia services may include at least one of a cellular telephone service, Voice over IP (VOIP) service, a message service, a broadcasting service, a wireless Internet service, a camera, an electronic payment, or a media replay.

The above information is presented as background information only to assist with an understanding of the disclosure. No determination has been made, and no assertion is made, as to whether any of the above might be applicable as prior art with regard to the disclosure.

SUMMARY

An electronic device may provide various services by using a camera to enhance users' convenience. For example, the electronic device may search information of a product photographed through a camera, and may output the information. It may also provide a translation service regarding a text included in an image obtained through a camera.

The electronic device may translate a text included in an image obtained through a camera into a language desired by a user, and may display the text. For example, the electronic device may recognize a text included in a preview image obtained through the camera, through optical character recognition (OCR) for the preview image. The electronic device may translate the text recognized from the preview image into a language desired by the user through a translation engine, and may render the translated text to a text region of the preview image.

Since the electronic device drives the OCR and the translation engine in the electronic device, performance of the translation service may be limited. The electronic device may download a database and a translation engine for translation of text from an external device, and may store the same in the electronic device to enhance the performance of the translation service. This may consume a large amount of the memory of the electronic device.

Certain embodiments of the disclosure provide an apparatus and a method for providing a translation service of a text included in an image obtained through a camera by using an external electronic device in an electronic device.

According to certain embodiments of the disclosure, an electronic device comprises a camera, a display, a transceiver, a memory, and a processor, wherein the processor is configured to display a first image comprising one or more external objects obtained by using the camera through the display, identify at least one external object corresponding to a text among the one or more external objects during at least part of a time that the first image is displayed, transmit a partial image of the first image that corresponds to the at least one external object to an external electronic device through the transceiver, receive a text corresponding to the text from the external electronic device through the transceiver, identify a motion of the electronic device or the at least one external object which is generated during a time that the partial image is transmitted and the corresponding text is received from the external electronic device, and display the corresponding text on the at least one external object by compensating for the motion while a second image comprising the at least one external object is displayed through the display.

According to certain embodiments of the disclosure, an operating method of an electronic device comprises displaying, on a display of the electronic device, a first image comprising one or more external objects obtained by using a camera, which is operatively connected with the electronic device, identifying at least one external object corresponding to a text among the one or more external objects during at least part of a time that the first image is displayed, transmitting a partial image of the first image that corresponds to the at least one external object to an external electronic device, receive a text corresponding to the text from the external electronic device, identifying a motion of the electronic device or the at least one external object which is generated during a time that the partial image is transmitted and the corresponding text is received from the external electronic device, displaying the corresponding text on the at least one external object by compensating for the motion while a second image comprising the at least one external object is displayed through the display.

According to certain embodiments of the disclosure, an electronic device comprises a camera, a display, a transceiver, a memory, and a processor, wherein the processor is configured to display a first image obtained by using the camera through the display, transmit at least one partial image and an entire image of the first image to an external electronic device through the transceiver, when text information corresponding to a partial image or an entire image is received from the external electronic device through the transceiver, refine a region for displaying the text information based on the partial image or the entire image, calibrate a position of the text information based on motion information of the electronic device or at least one external object included in the first image, and display the text information on a second image, based on the refined region information and position information.

According to certain embodiments, there is a method for annotating a picture, comprising displaying a picture comprising an object bearing text at a location within the picture; extracting the text; and displaying another text on the object in another picture comprising the object at another location within the another picture.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Certain embodiments of the disclosure will be described herein below with reference to the accompanying drawings. In the following description, well-known functions or constructions are not described in detail since they would obscure the disclosure in unnecessary detail. Also, the terms used herein are defined according to the functions of the disclosure. Thus, the terms may vary depending on user's or operator's intension and usage. That is, the terms used herein must be understood based on the descriptions made herein.

Figure 1:
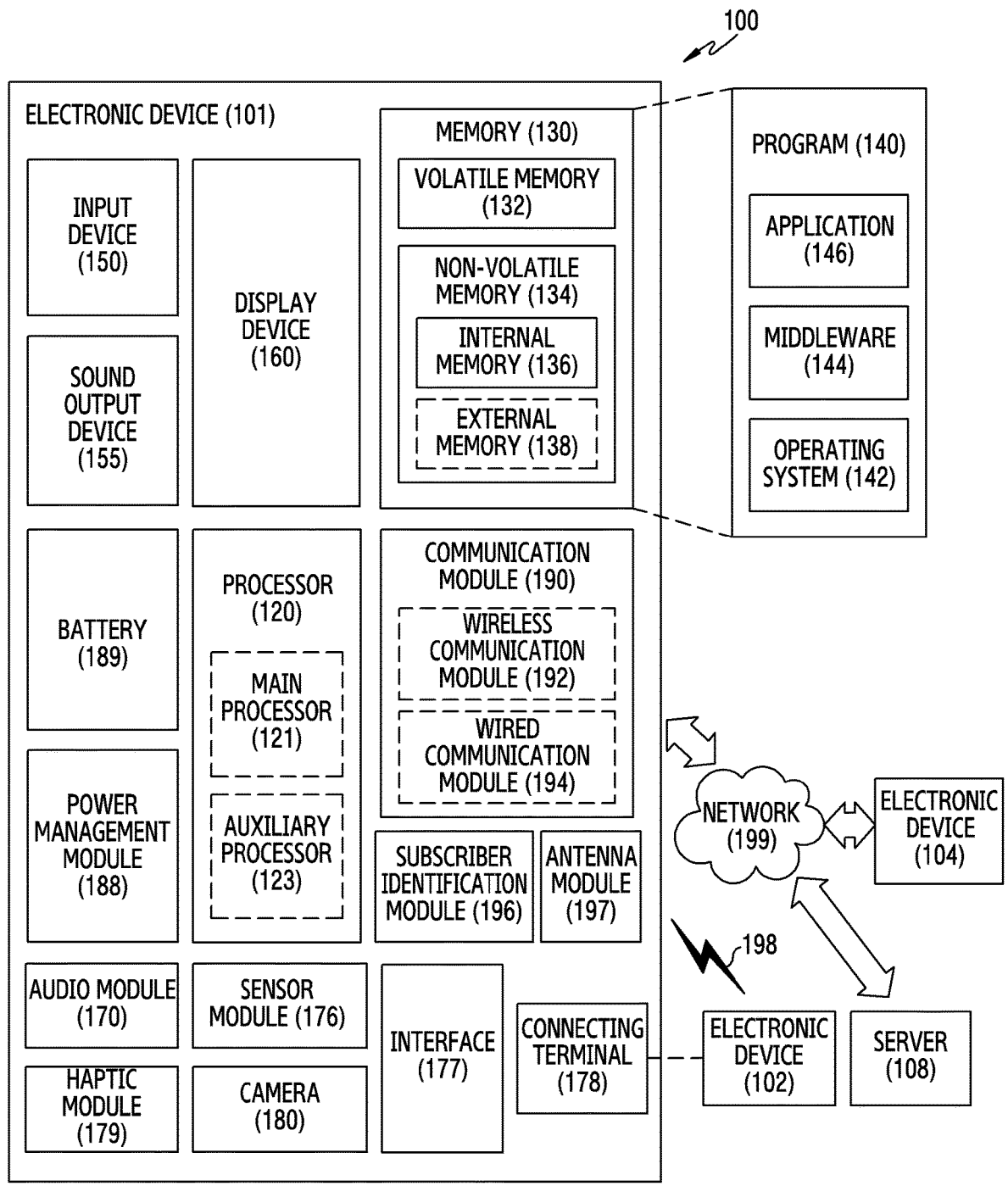
FIG. 1 is a block diagram of an electronic device for managing data related to an application in a network environment according to certain embodiments of the disclosure.

FIG. 1 is a block diagram illustrating an electronic device 101 to manage data related with an application in a network environment 100 according to certain embodiments. Referring to FIG. 1, the electronic device 101 in the network environment 100 may communicate with an electronic device 102 via a first network 198 (e.g., a short-range wireless communication), or an electronic device 104 or a server 108 via a second network 199 (e.g., a long-range wireless communication). According to an embodiment, the electronic device 101 may communicate with the electronic device 104 via the server 108. According to an embodiment, the electronic device 101 may include a processor 120, memory 130, an input device 150, a sound output device 155, a display device 160 (a touch screen display), an audio module 170, a sensor module 176 (a motion sensor), an interface 177, a haptic module 179, a camera 180, a power management module 188, a battery 189, a communication module 190 (a wireless communication circuitry that may include, among other things, a transmitter/receiver (transceiver), modulator/demodulator (MODEM), and oscillators), a subscriber identification module (SIM) 196, or an antenna module 197. In some embodiments, at least one (e.g., the display device 160 or the camera 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display). The term "transceiver" can refer to a single transmitter/receiver, or a set of transmitters and receivers.

The processor 120 may execute, for example, software (e.g., a program 140) to control at least one other component (e.g., a hardware or software component) of the electronic device 101 coupled with the processor 120, and may perform various data processing or computation. The term "processor", although used in the singular shall be understood to mean one or more processors. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera 180 may capture a still image or moving images. According to an embodiment, the camera 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

In one embodiment, the wireless communication module 190 may distinguishes or authenticates the electronic device 101 in the communication network by using user information stored in the Subscriber Identification Module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
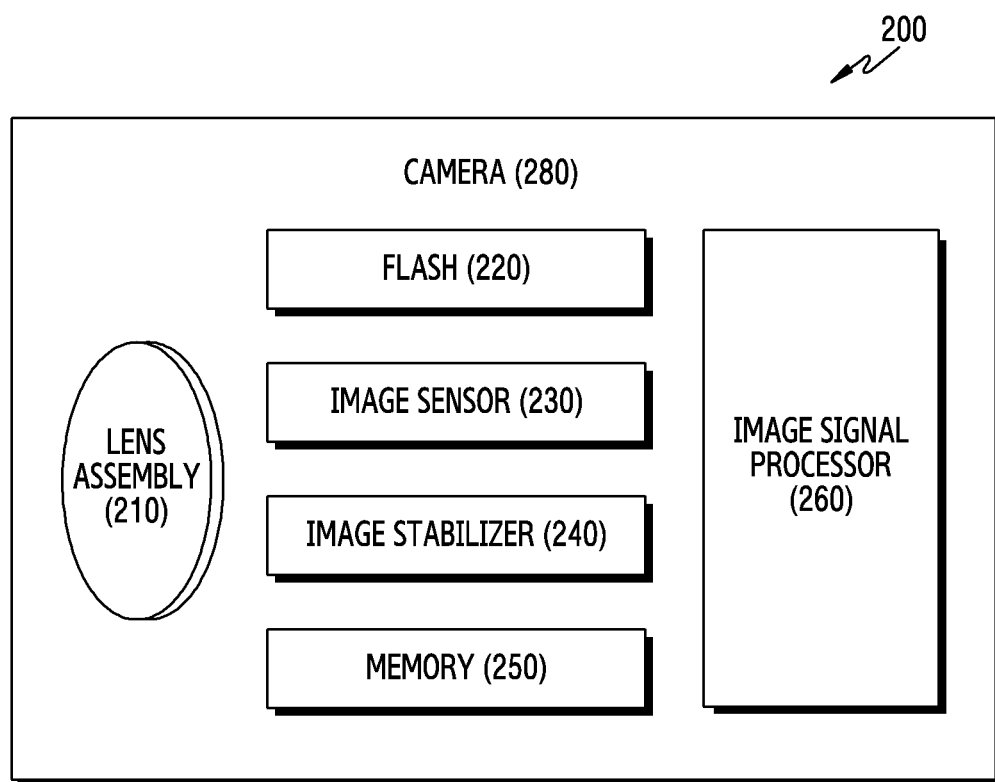
FIG. 2 is a block diagram illustrating a camera according to certain embodiments of the disclosure.

FIG. 2 is a block diagram 200 illustrating the camera 180 according to certain embodiments. Referring to FIG. 2, the camera 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera 180 may include a plurality of lens assemblies 210. In such a case, the camera 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera 180 or the electronic device 101 including the camera 180. This allows compensating for at least part of a negative effect (e.g., image blurring) by the movement on an image being captured. According to an embodiment, the image stabilizer 240 may sense such a movement by the camera 180 or the electronic device 101 using a gyro sensor (not shown) or an acceleration sensor (not shown) disposed inside or outside the camera 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera 180. An image processed by the image signal processor 260 may be stored back in the memory 250 for further processing, or may be provided to an external component (e.g., the memory 130, the display device 160, the electronic device 102, the electronic device 104, or the server 108) outside the camera 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of cameras 180 having different attributes or functions. In such a case, at least one of the plurality of cameras 180 may form, for example, a wide-angle camera and at least another of the plurality of cameras 180 may form a telephoto camera. Similarly, at least one of the plurality of cameras 180 may form, for example, a front camera and at least another of the plurality of cameras 180 may form a rear camera.

An electronic device according to certain embodiments of the disclosure may include various types of electronic devices. The electronic device may include at least one of, for example, a portable communication device (e.g., a smartphone), a computer device, a portable multimedia device, a portable medical device, a camera, a wearable device, or a home appliance. The electronic device according to an embodiment of the disclosure is not limited to the above-described devices.

It should be appreciated that certain embodiments of the disclosure and the terms used therein are not intended to limit the technological features set forth herein to particular embodiments, and include various changes, equivalents, and/or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and/or B," "A, B, or C," or "at least one of" A, B, and/or C" may include all possible combinations of the items enumerated together in a corresponding one of the phrases. As used herein, such terms as "1ˢᵗ" and "2ⁿᵈ," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Certain embodiments as set forth herein may be implemented as software (e.g., the program 140) including instructions that are stored in a machine-readable storage medium (e.g., internal memory 136 or external memory 138) that is readable by a machine (e.g., a computer). The machine may invoke an instruction stored in the storage medium, and may be operated according to the instruction invoked, and may include an electronic device (e.g., the electronic device 101) according to disclosed embodiments. When the instruction is executed by a processor (e.g., the processor 120), the processor may execute a function corresponding the instruction directly or using other components under the control of the processor. The instruction may include a code generated or executed by a complier or an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in a storage medium, such as memory of the manufacturer's server, a server of the application store, or a relay server.

According to certain embodiments, each component (e.g., a module or a program) of the above-described components may include a single entity or multiple entities. One or more of the above-described sub components may be omitted, or one or more other sub components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment, the processor 120 may control the communication module 190 to transmit an image (preview image) obtained through the camera 180 to an external electronic device (for example, the electronic device 102, the electronic device 104, or the server 108) for a translation service. For example, the processor 120 may determine whether to transmit the image obtained through the camera 180, based on at least one of a quality of the image obtained through the camera 180 or motion information obtained through the sensor module 176. For example, when a definition (for example, a blur state) of the image obtained through the camera 180 is less than or equal to a reference value, the processor 120 may determine that there is a limit to translation of the image obtained through the camera 180. That is, when the definition of the image obtained through the camera 180 is less than or equal to the reference value, the processor 120 may determine not to transmit the image obtained through the camera 180 to the external electronic device. For example, when the number of feature points of the image obtained through the camera 180 is less than a reference number, or when the feature points are distributed by longer than a reference distance, the processor 120 may determine that there is a limit to translation of the image obtained through the camera 180. The reference distance may include a maximum distance between feature points which are able to form a text. For example, when a motion of the electronic device 100 falls out of a reference range based the motion information obtained through the sensor module 176, the processor 120 may determine that there is a limit to translation of the image obtained through the camera 180. For example, when it is determined that the image obtained through the camera 180 is to be transmitted to the external electronic device, the processor 120 may control the communication module 190 to transmit at least one partial image and an entire image corresponding to the image to the external electronic device. For example, the processor 120 may extract at least one partial image based on at least one of a history of using a translation service or a distribution of the feature points of the image. The history of using the translation service, which is at least one text region probability model corresponding to the history of using the translation service, may include region information on the display device 160 on which a text of an external object has been photographed and displayed for the translation service in the electronic device 101. For example, the processor 120 may control the communication module 190 to transmit the at least one partial image and the entire image corresponding to the image to different external electronic devices.

According to an embodiment, the processor 120 may calibrate a display region of a text translated into a different language, which is received from the external electronic device (for example, the electronic device 102, the electronic device 104, or the server 108) through the communication module 190. For example, the processor 120 may receive, through the communication module 190, a text included in the image (partial image or entire image) transmitted to the external electronic device, and region information of the text (for example, a position, a size, and a length of the text). The processor 120 may set a region of interest (ROI) corresponding to the text in the image transmitted to the external electronic device, based on the region information of the text. The processor 120 may set pixels having the same brightness or color attribute in the region of interest to a text candidate region. The processor 120 may set a text display region by removing an outlier which is not appropriate to the characteristic of the text in the text candidate region. For example, the outlier may include at least one pixel positioned on a boundary of the region of interest in the text candidate region. For example, the text may include a text which is recognized through an optical character recognition method or a text which is translated through a translation engine.

According to an embodiment, the processor 120 may determine an additional attribute of the text through a display region of the text to display the text translated into the different language, which is received from the external electronic device, on the corresponding region. For example, the additional attribute of the text may include at least one of a color of the text, a background color, or a size or a font of the text. For example, the processor 120 may identify the attribute of brightness or color of pixels included in the display region of the text, and may distinguish a text region from a background region. The processor 120 may set at least one of a color, a size, or a font of the text translated into the different language, based on at least one of a size of the text region or color attributes of pixels included in the text region. The processor 120 may set a color (background color) of a region (background) except for the text in the display region of the text, based on color attributes of pixels included in the background region. For example, the color of the region except for the text may be set based on an average of the color attributes of the pixels included in the background region. For example, the color of the region except for the text may be set based on color attributes which are most distributed among the color attributes of the pixels included in the background region.

According to an embodiment, the processor 120 may calibrate the display position of the text translated into the different language, which is received from the external electronic device (for example, the electronic device 102, the electronic device 104, or the server 108), based on the motion information of the electronic device 101 detected through the sensor module 176. For example, the processor 120 may continuously collect the motion information of the electronic device 101 through the sensor module 176 from the time that the image (preview image) is obtained through the camera 180. The processor 120 may detect a difference between the image transmitted to the external electronic device, and an image displaying the text translated into the different language, which is received from the external electronic device, based on the motion information of the electronic device 101. The processor 120 may calibrate the display position of the text translated into the different language, based on the difference between the images.

According to an embodiment, the processor 120 may refine the result of the translation service, based on texts translated into the different language, which correspond to a plurality of images (for example, a partial image or entire image) received from the external electronic device (for example, the electronic device 102, the electronic device 104, or the server 108) through the communication module 190. For example, when a text translated into a different language that corresponds to one image of the images transmitted to the external electronic device is received, the processor 120 may determine whether there is a text corresponding to another image in a region for displaying the text translated into the different language. When there is no text corresponding to another image in the corresponding region, the processor 120 may render the text translated into the different language, which is received from the external electronic device, to be displayed in the corresponding region. When there is the text corresponding to another image in the corresponding region, the processor 120 may select a text having a relatively higher reliability from the text corresponding to another image and the text translated into the different language, received from the external electronic device, as the text to be displayed in the corresponding region. For example, the reliability of the text may be calculated, based on at least one of a position of the text in the image or an accuracy of the text.

Figure 3:
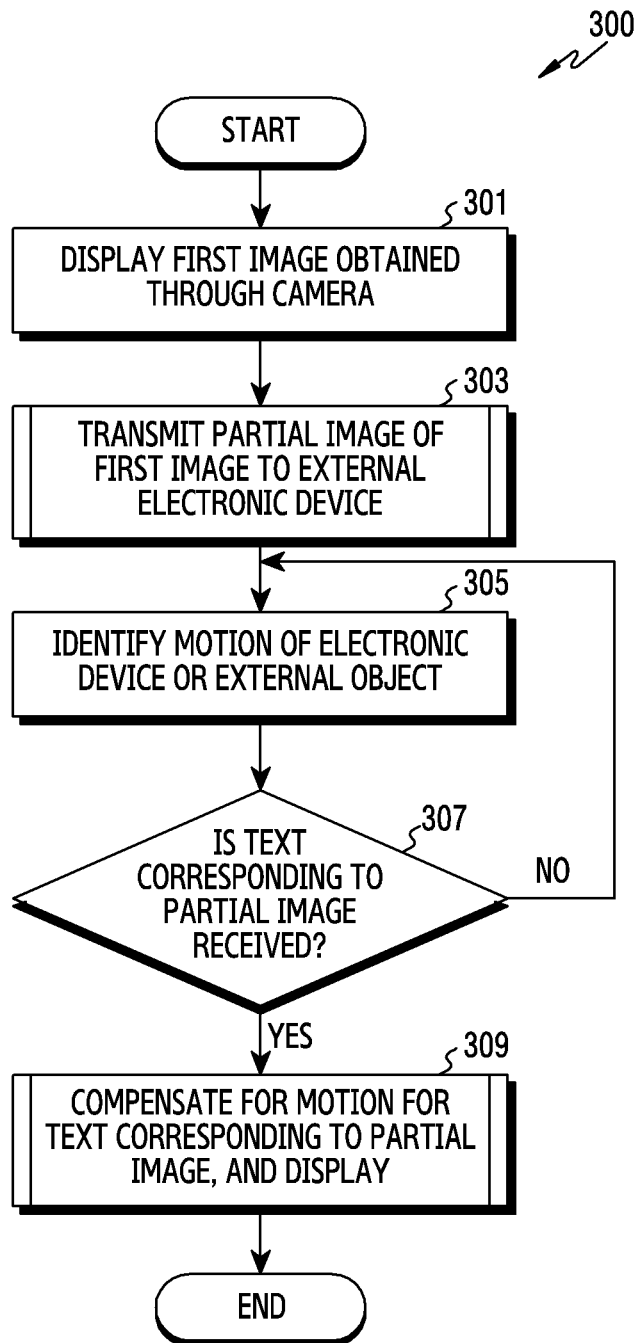
FIG. 3 is a flowchart for providing a translation service by using an external electronic device in an electronic device according to certain embodiments of the disclosure.

FIG. 3 is a flowchart 300 for providing a translation service by using an external electronic device in an electronic device according to certain embodiments of the disclosure. In the following description, the electronic device may include the electronic device 101 of FIG. 1 or at least part (for example, the processor 120) of the electronic device 101.

Referring to FIG. 3, in operation 301, the electronic device (for example, the processor 120) may display a first image including at least one external object obtained through a camera (for example, the camera 180 of FIG. 1) on a display device (for example, the display device 160 of FIG. 1). For example, the first image may include a preview image obtained through the camera 180. One of the external objects can bear text.

In operation 303, the electronic device (for example, the processor 120) may transmit at least one partial image of the first image to the external electronic device. For example, the processor 120 may determine whether to transmit the preview image, based on at least one of a definition (for example, a blur state) of the preview image, the number of feature points of the preview image, or motion information obtained through the sensor module 176. When it is determined that the preview image is to be transmitted to the external electronic device, the processor 120 may control to transmit at least one partial image and an entire image of the preview image to the external electronic device through the communication module 190. For example, the partial image may be extracted from the preview image based on at least one of a history of using a translation service (for example, a text region probability model) or a distribution of feature points of the image. For example, the processor 120 may control to transmit at least one partial image and an entire image of the preview image to different external electronic devices through the communication module 190. For example, the processor 120 may control to transmit, to the external electronic device through the communication module 190, at least one image (for example, at least one of the partial image and the entire image), and language information for translating a text included in the image. In certain embodiments, the partial image can be extracted to extract the text that is one of the objects.

In operation 305, the electronic device (for example, the processor 120) may identify a motion of the electronic device or the external object included in the first image. For example, the processor 120 may collect, through the sensor module 176, motion information of the electronic device occurring while the image for translating the text included in the image is transmitted and a text corresponding to the image is received.

In operation 307, the electronic device (for example, the processor 120) may determine whether a text (text information) corresponding to the partial image transmitted to the external electronic device is received. For example, the text corresponding to the partial image may include a text of a second language (for example, Korean) translated from the text of a first language (for example, English) extracted from the image. For example, the processor 120 may receive the text corresponding to the partial image and region information (for example, a position, a size, and a length of the text) of the text in the corresponding image. However, the disclosure is not limited to language translation. In certain embodiments, the received text can be synonym for the text. In other embodiments, the received text can be an update for the text. For example, if the text is information that is time-varying, the received text can include an update of the information.

When the text corresponding to the partial image transmitted to the external electronic device is not received ("No" in operation 307), the electronic device (for example, the processor 120) may continuously identify the motion of the electronic device or the external object included in the first image in operation 305.

When the text corresponding to the partial image transmitted to the external electronic device is received ("Yes" in operation 307), the electronic device (for example, the processor 120) may compensate for a position of the text corresponding to the partial image, based on the motion information of the electronic device or the external object included in the first image, and may display the text on the display device (for example, the display device 160 of FIG. 1) in operation 309.

For example, the processor 120 may detect a position change of the first image displayed on the display device 160 or the external object included in the first image, which occurs between the time that the first image is obtained and a current time, based on the motion information of the electronic device or the external object included in the first image. The processor 120 may compensate for the position of the text corresponding to the partial image, based on the position change of the first image or the external object included in the first image, and may control to display the text to overlap at least one external object through the display device 160.

Detection of a position change of the external image from the first image to a second image can be determined in a variety of ways. In certain embodiments, the camera can encode the first image and the second image using MPEG The motion information can be determined by examining the motion vectors in the first image, the second image, and each image in between. In one embodiment, electronic device can create motion vectors by encoding the first picture as an I-picture according to the MPEG standard, and encoding the second picture as a P-picture that is data dependent on the first picture. The motion vectors proximate to the object can be used to determine the motion.

Figure 4:
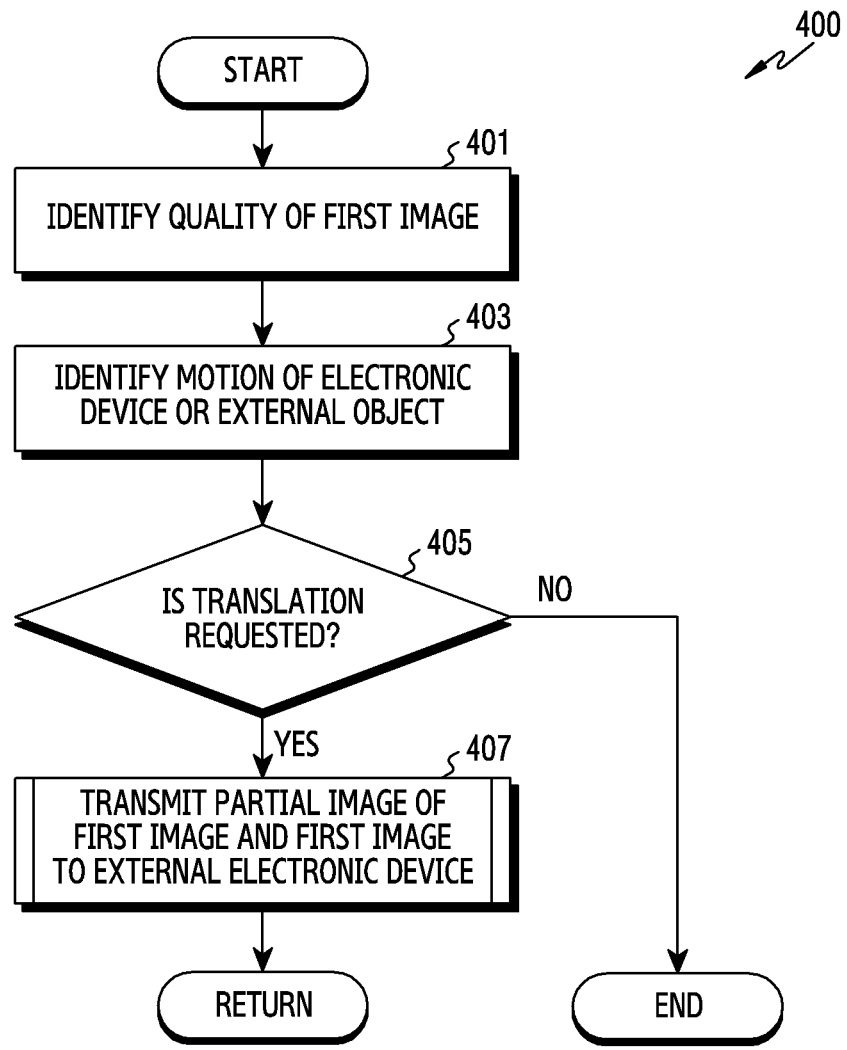
FIG. 4 is a flowchart for selectively transmitting an image for a translation service to an external electronic device in an electronic device according to certain embodiments of the disclosure.

FIG. 4 is a flowchart 400 for selectively transmitting an image for a translation service to an external electronic device in an electronic device according to certain embodiments of the disclosure. The following description may be about an operation of transmitting at least one partial image of a first image obtained through the camera 180 to the external electronic device in operation 303 of FIG. 3. In the following description, the electronic device may include the first electronic device 101 of FIG. 1 or at least part (for example, the processor 120) of the electronic device 101.

Referring to FIG. 4, when a first image (for example, a preview image) obtained through a camera (for example, the camera 180 of FIG. 1) is displayed on a display device (for example, the display device 160 of FIG. 1) (for example, operation 301 of FIG. 3), the electronic device (for example, the processor 120) may identify a quality of the first image in operation 401. For example, the quality of the first image may include at least one of a definition (for example, a blur state) of the first image, the number of feature points included in the first image, or a distribution of the feature points included in the first image.

In operation 403, the electronic device (for example, the processor 120) may identify a motion of the electronic device or at least one external object included in the first image. For example, the processor 120 may collect motion information of the electronic device 101 or at least one external object included in the first image from the time that the first image is obtained through the camera 180. For example, the motion of the electronic device 101 may be obtained through the sensor module 176 (for example, an acceleration sensor, a gravity sensor).

In operation 405, the electronic device (for example, the processor 120) may determine whether to request a translation of the first image, based on the quality of the first image and the motion information of the electronic device or at least one external object included in the first image. For example, when a resolution (for example, a blur state) of the first image is higher than or equal to a reference value, that is, is good, the processor 120 may determine to provide the translation service of the first image. As noted above, although the present embodiment uses translation, the disclosure is not limited to translation. For example, when the number of feature points of the first image is larger than a reference number or the feature points are concentrated on a certain region, the processor 120 may determine to provide the translation service of the first image. For example, when the motion of the electronic device 101 obtained through the sensor module 176 falls within a reference range, the processor 120 may determine to provide the translation service of the first image. For example, when the motion of the preview image obtained through the camera 180 falls within the reference range, the processor 120 may determine to provide the translation service of the first image. For example, the motion of the preview image may include a motion of at least one object included in the preview image. The processor 120 may detect the motion of the object included in the preview image by comparing continuous preview images (for example, pixels forming the image) obtained through the camera 180.

When it is determined that the translation of the first image is not requested (for example, "No" in operation 405), the electronic device (for example, the processor 120) may put a limit to transmitting of the first image. For example, when it is determined that the translation of the first image is not requested, the processor 120 may control to display a guidance message indicating that there is a limit to the translation service through the display device 160. For example, the guidance message may include a reason why the translation service is limited.

When it is determined that the translation of the first image is requested (for example, "Yes" in operation 405), the electronic device (for example, the processor 120) may transmit at least one partial image and an entire image of the first image to at least one external electronic device. For example, the processor 120 may extract at least one partial image from the first image, based on at least one of a history of using the translation service (for example, a text region probability model) or a distribution of feature points of the first image. The processor 120 may transmit the at least one partial image extracted from the first image, and the entire image to at least one external electronic device through the communication module 190.

Figure 5:
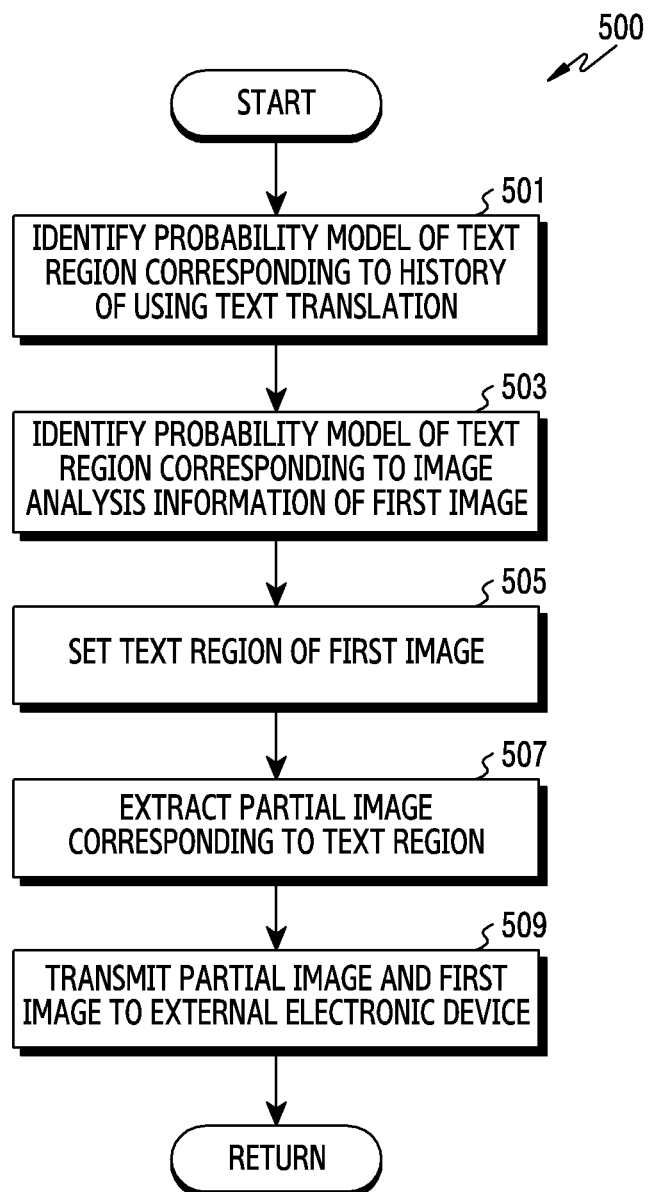
FIG. 5 is a flowchart for extracting a partial image of an image obtained through a camera in an electronic device according to certain embodiments of the disclosure.
Figure 6:
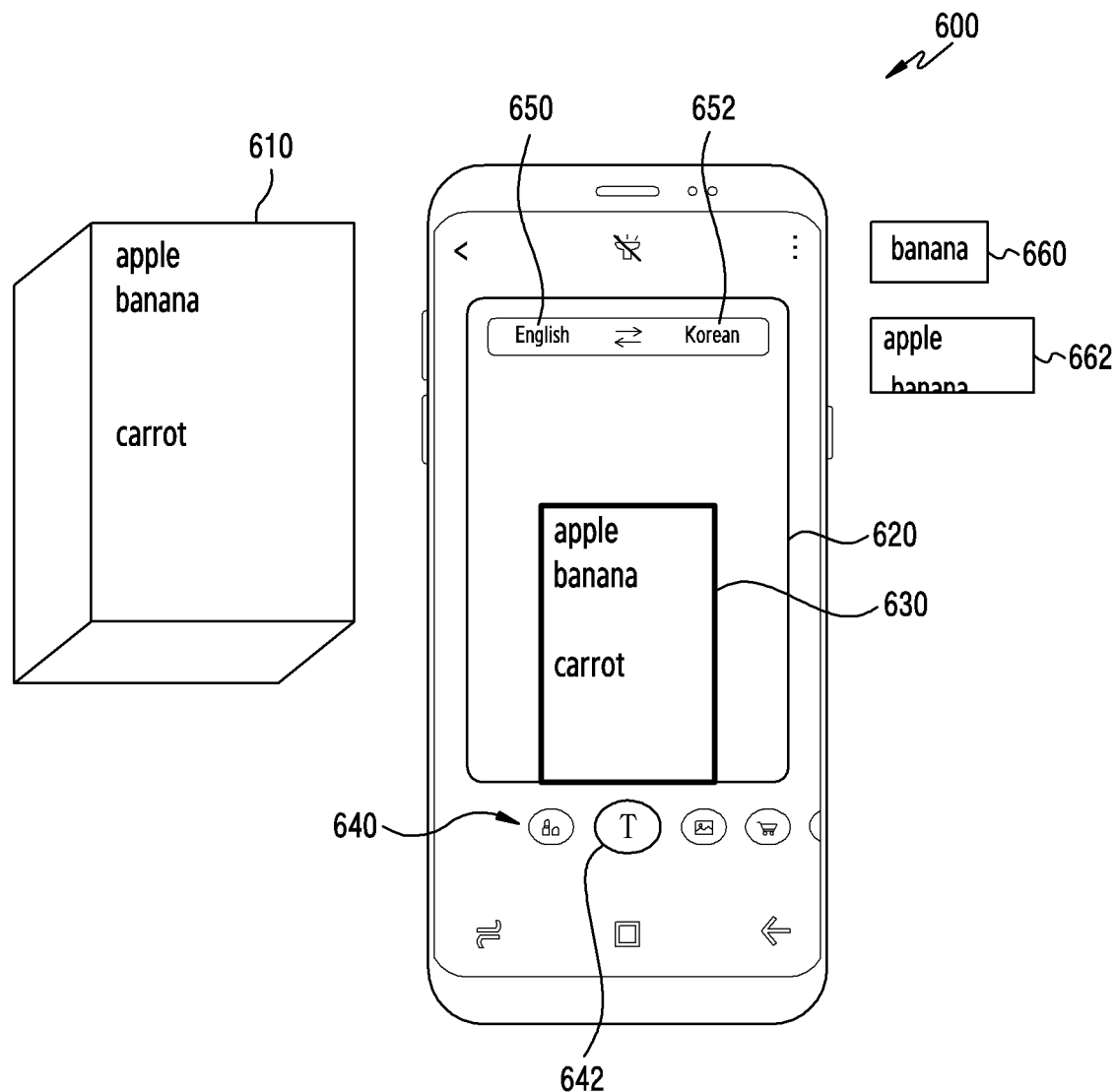
FIG. 6 is a view illustrating a configuration of an image obtained through a camera according to certain embodiments of the disclosure.

FIG. 5 is a flowchart 500 for extracting a partial image of an image obtained through a camera in an electronic device according to certain embodiments of the disclosure. FIG. 6 illustrates a configuration 600 of an image obtained through the camera according to certain embodiments of the disclosure. The following description may be about an operation of transmitting an image to an external electronic device in operation 407 of FIG. 4. In the following description, the electronic device may include the electronic device 101 of FIG. 1 or at least part (for example, the processor 120) of the electronic device 101. Object 610 is an object that bears text. The electronic device can take picture 620 of the object that bears the text, and extract the text 660, 662.

Referring to FIG. 5, when a translation service of a first image (for example, a preview image) obtained through a camera (for example, the camera 180 of FIG. 1) is provided (for example, operation 405 of FIG. 4), the electronic device (for example, the processor 120) may identify a probability model of at least one text region corresponding to a history of using a translation service in operation 501. For example, the probability model of the text region corresponding to the history of using the translation service may include region information on the display 160 on which a text of an external object has been photographed and displayed for a translation service. The probability model of the text region corresponding to the history of using the translation service may be refined as the translation service is provided, and may include at least one region.

In operation 503, the electronic device (for example, the processor 120) may identify a probability model of a text region corresponding to image analysis information of the first image obtained through the camera (for example, the camera 180 of FIG. 1). For example, the probability model of the text region corresponding to the image analysis information of the first image may include at least one piece of region information set based on a distribution of feature points extracted from the first image. For example, the probability model of the text region corresponding to the image analysis information of the first image may include information of at least one region on which a number of feature points larger than or equal to a reference number are concentrated within the first image.

In operation 505, the electronic device (for example, the processor 120) may set at least one text region of the first image. The at least one text region of the first image can be based on a probability model of the text region. The probability model can correspond to at least one of the history of using the translation service or the image analysis information of the first image. For example, the processor 120 may control to display a preview image 620 regarding an external object 610 obtained through the camera 180 through the display device 160 as shown in FIG. 6. When the probability model of the text region corresponding to the history of using the translation service is arranged on the center of the display device 160, the processor 120 may set at least part of the center of the preview image 620 as the text region of the first image. The processor 120 may set at least part of the center of the preview image 620 on which feature points are concentrated by the texts "apple" and "banana" within the preview image 620, as the text region of the first image.

The processor 120 may set, as the text region of the first image, a region corresponding to at least one probability model overlapping the region on which the feature points are concentrated at least in part from among a plurality of probability models of the text region corresponding to the history of using the translation service. For example, the text region of the first image may include at least some region estimated as having a text within the first image. For example, the preview image 620 may include an image 630 of the external object 610, a language 650 of a text included in the image, and a language 652 for translation of the text. The display device 160 may display a service list 640 related to the preview image 620 on at least some regions as shown in FIG. 6. The service list 640 may include a menu (for example, "text") 642 for selecting the translation service.

In operation 507, the electronic device (for example, the processor 120) may extract at least one partial image corresponding to the at least one text region of the first image. For example, the processor 120 may extract partial images 660 and 662 corresponding to the respective text regions of the preview image 620 of FIG. 6. For example, the processor 120 may generate the partial images 660 and 662 corresponding to the respective text regions which are not continuous within the preview image 620. In certain embodiments, the partial images 660 and 662 can be selected to primarily contain text and surrounding pixels of the image. For example OCR can be used to identify text in the image and partial images 660 and 662 can be selected to extract the portion of the image that primarily include the text and surrounding pixels.

In some cases, a partial image, e.g., partial image 662, can be properly isolate text. Partial image 662 for example includes the text "apple" and part of the text "banana" with the bottom portion of "banana" clipped off.

In operation 509, the electronic device (for example, the processor 120) may transmit at least one partial image and an entire image of the first image to at least one external electronic device. For example, the processor 120 may control to transmit the partial images 660 and 662 extracted from the preview image 620 of FIG. 6 to the at least one external electronic device through the communication module 190. For example, the processor 120 may control to transmit the first partial image 660, the second partial image 662, and the entire image 620 to different external electronic devices through the communication module 190.

Figure 7:
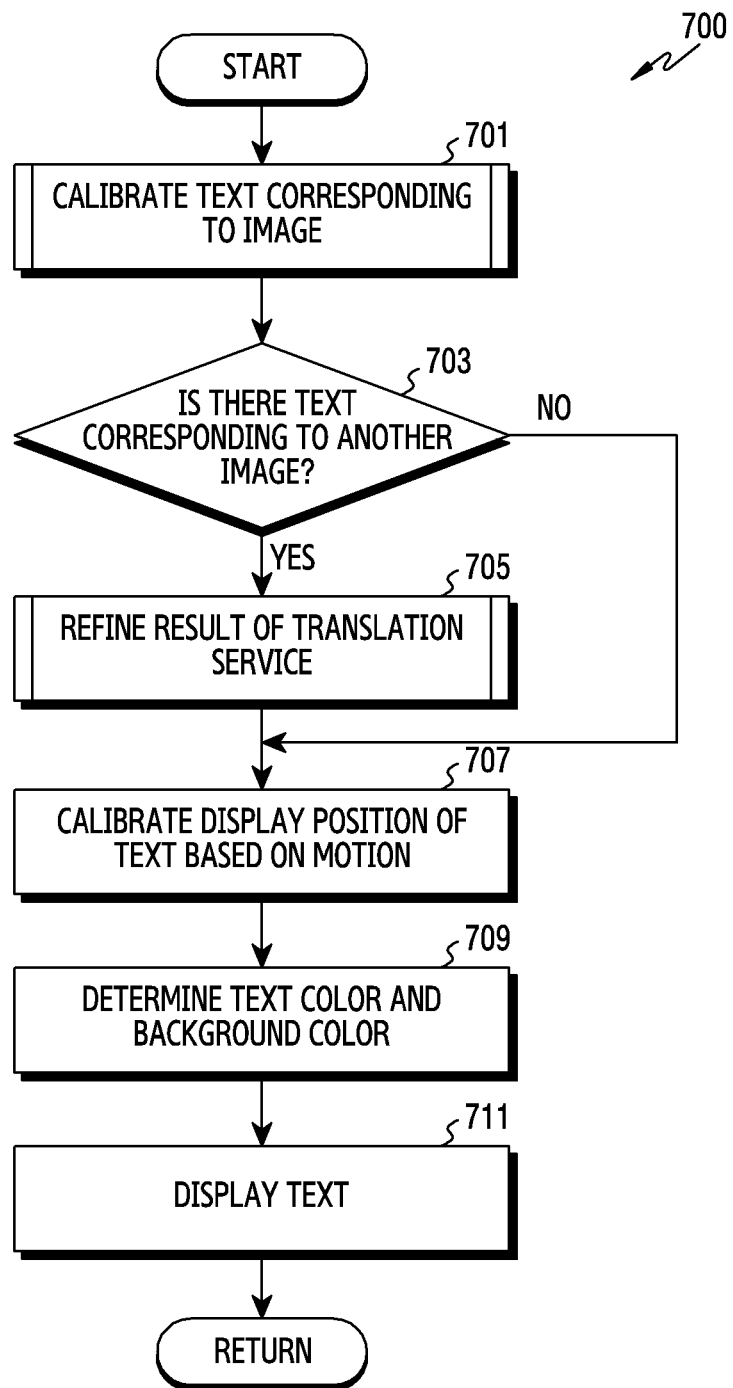
FIG. 7 is a flowchart for displaying a translated text which is received from an external electronic device in an electronic device according to certain embodiments of the disclosure.
Figure 8A:
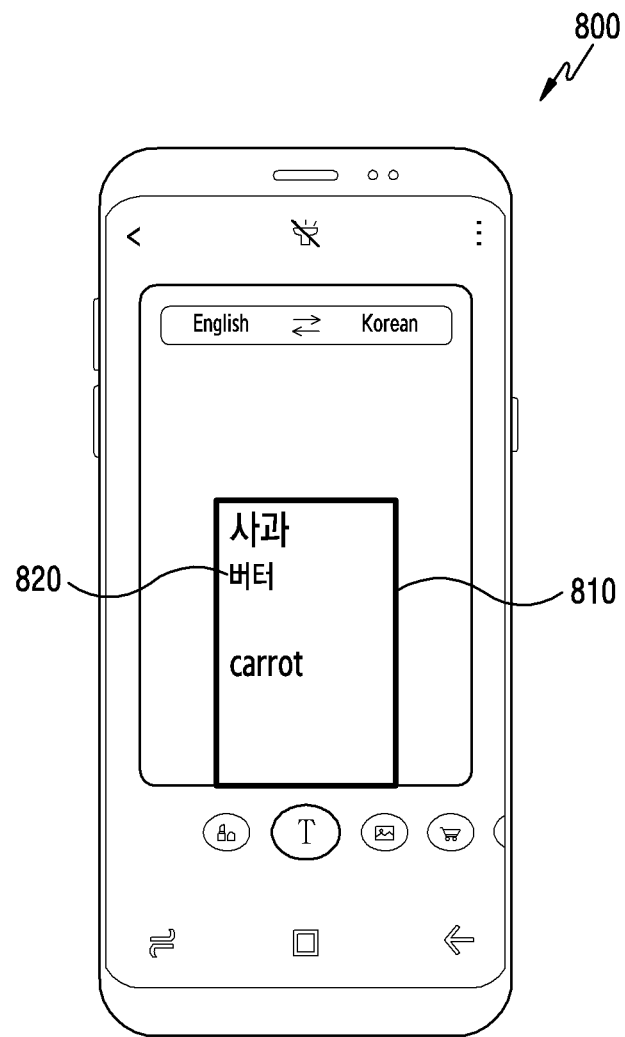
FIG. 8A is a view illustrating a screen for a translation service of an image obtained through a camera according to certain embodiments of the disclosure.
Figure 8B:
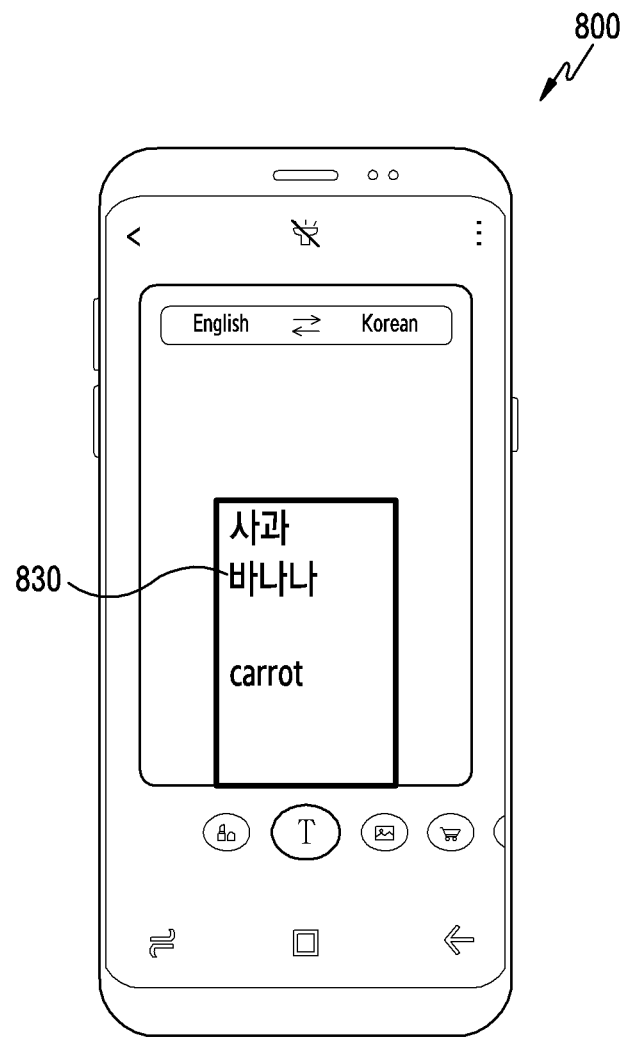
FIG. 8B is a view illustrating the screen for the translation service of the image obtained through the camera according to certain embodiments of the disclosure.
Figure 8C:
FIG. 8C is a view illustrating the screen for the translation service of the image obtained through the camera according to certain embodiments of the disclosure.
Figure 8D:
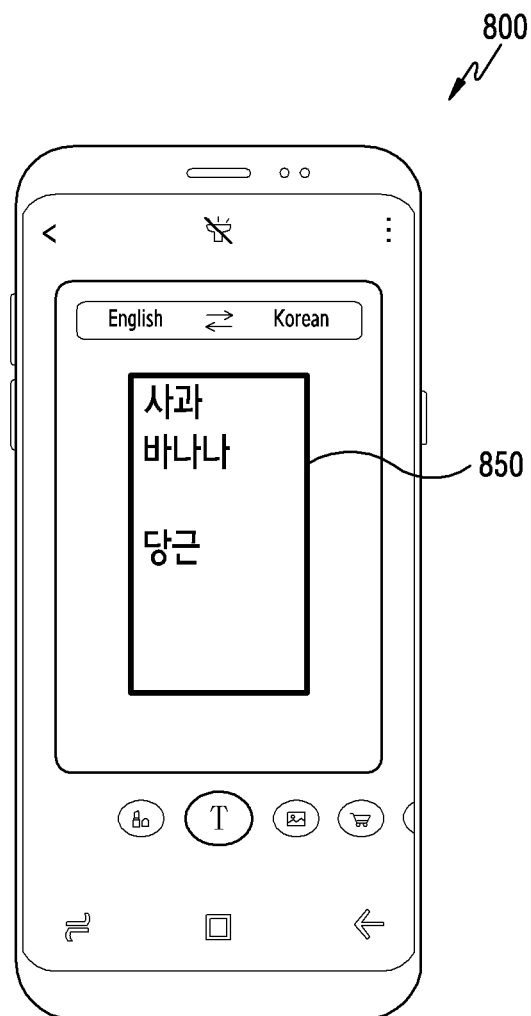
FIG. 8D is a view illustrating the screen for the translation service of the image obtained through the camera according to certain embodiments of the disclosure.
Figure 8E:
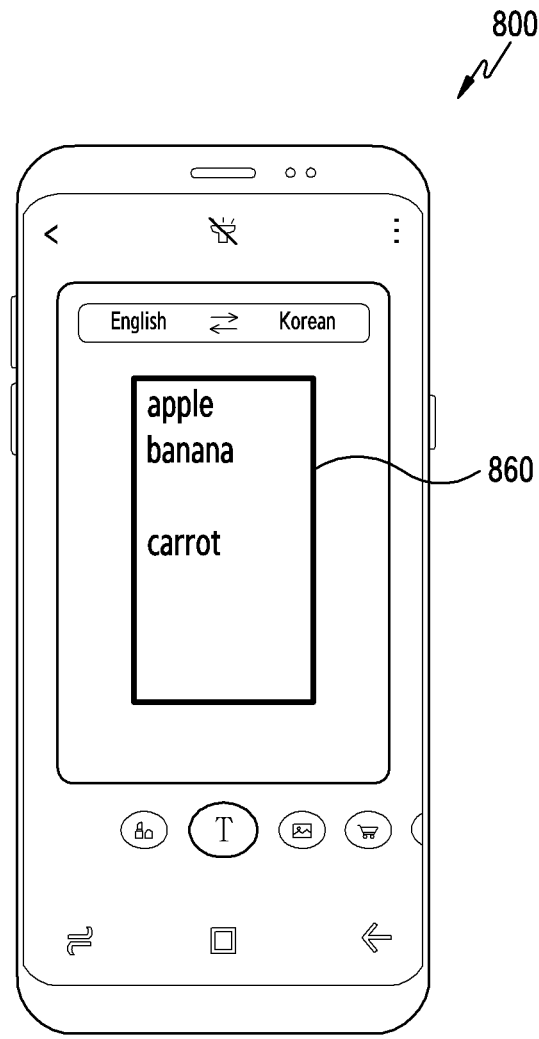
FIG. 8E is a view illustrating the screen for the translation service of the image obtained through the camera according to certain embodiments of the disclosure.
Figure 8F:
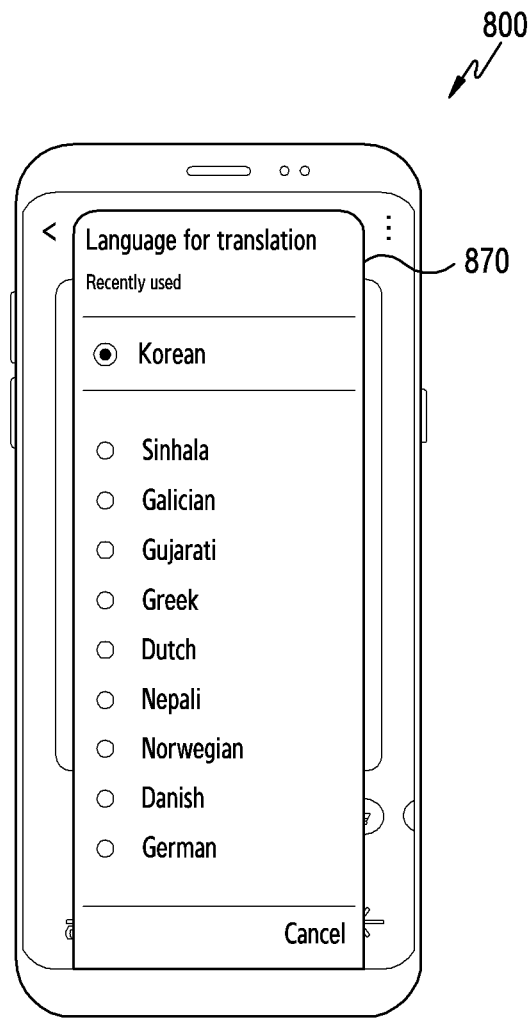
FIG. 8F is a view illustrating the screen for the translation service of the image obtained through the camera according to certain embodiments of the disclosure.

FIG. 7 is a flowchart 700 for displaying a translated text (or otherwise corresponding text) which may be received from an external electronic device in an electronic device according to certain embodiments of the disclosure. FIG. 8A illustrates a screen 800 for a translation service of an image obtained through a camera according to certain embodiments of the disclosure, FIG. 8B illustrates the screen 800 for the translation service of the image obtained through the camera according to certain embodiments of the disclosure, FIG. 8C illustrates the screen 800 for the translation service of the image obtained through the camera according to certain embodiments of the disclosure, FIG. 8D illustrates the screen 800 for the translation service of the image obtained through the camera according to certain embodiments of the disclosure wherein the object has moved, FIG. 8E illustrates the screen 800 for the translation service of the image obtained through the camera according to certain embodiments of the disclosure, and FIG. 8F illustrates the screen 800 for the translation service of the image obtained through the camera according to certain embodiments of the disclosure. The following description may be about an operation of displaying a text corresponding to a partial image in operation 307 of FIG. 3. In the following description, the electronic device may include the electronic device 101 of FIG. 1 or at least part (for example, the processor 120) of the electronic device 101.

Referring to FIG. 7, when a text corresponding to an image is received from an external electronic device (for example, operation 307 of FIG. 3), the electronic device (for example, the processor 120) may calibrate the text received from the external electronic device in operation 701. For example, when the text corresponding to the image is received from the external electronic device, the processor 120 may identify region information (for example, a position, a length, and a size of the text) of the text extracted in the external electronic device. The processor 120 may refine the region information of the text based on a text display region estimated based on the image. For example, the image may include any one image of a plurality of images (at least one partial image and an entire image) related to a first image transmitted to the external electronic device for the translation service of the first image.

In operation 703, the electronic device (for example, the processor 120) may determine whether there exists a text corresponding to another image received from the external electronic device. For example, the processor 120 may determine whether a text corresponding to another image among the at least one partial image and the entire image transmitted to the external electronic device was received at a previous time. For example, another image may include another image different from the image of the plurality of images (at least one partial image and the entire image) related to the first image transmitted to the external electronic device for the translation service of the first image.

When there exists the text corresponding to another image, received from the external electronic device at the previous time (for example, "Yes" in operation 703), the electronic device (for example, the processor 120) may refine the result of the translation service, which is received from the external electronic device at the previous time, based on the text corresponding to the image in operation 705. For example, when there exists the text corresponding to another image, received at the previous time, on the same position as that of the text corresponding to the image received from the external electronic device, the processor 120 may select a text to be displayed on the corresponding position based on the reliability of each text. For example, the reliability of the text may be determined based on a position of the text in the image (partial image or entire image) transmitted to the external electronic device to extract the text, or an accuracy of the text. For example, the accuracy of the text may indicate an accuracy regarding whether the text received from the external electronic device can be interpreted as a text of a specific language. For example, when there is a difference in a position between the text corresponding to the image received from the external electronic device and the text corresponding to another image received at the previous time, the processor 120 may add the text corresponding to the image to the result of the translation service received from the external electronic device.

When there is no text corresponding to another image received from the external electronic device at the previous time (for example, "No" in operation 703), or when the result of the translation service is refined (for example, operation 705), the electronic device (for example, the processor 120) may calibrate a display position of the text received from the external electronic device, based on motion information of the electronic device or the external object included in the first image in operation 707. For example, the processor 120 may detect a difference between the first image transmitted to the external electronic device for the translation service, and a second image obtained through the camera 180 at the time that the text received from the external electronic device is displayed, based on the motion information of the electronic device or the external object included in the first image. The processor 120 may calibrate the display position of the text received from the external electronic device, based on the difference between the first image and the second image. For example, the motion information of the electronic device or the external object included in the first image may be continuously collected from the time that the first image is obtained for the translation service.

In certain embodiments, the first image can include a live image provided by the camera and displayed on the display when the camera has not captured the image. The second image can include the live image provided by the camera when the corresponding text is received. During the time that the text was sent to the external device and the corresponding text was received, the object may have, or the camera may have moved. Accordingly, the object bearing the text will be at a different position in the second picture. Therefore, to place the received corresponding text onto the object bearing the text, the motion is compensated from the original location of the text in the first image.

In operation 709, the electronic device (for example, the processor 120) may determine a text color and a background color for displaying the text received from the external electronic device, based on color information of a text display region for displaying the text received from the external electronic device within the first image.

For example, it is noted that in the second image, the colors of the pixels forming the object bearing the image may have changed. For example, if the object has moved, the lighting might have changed causing different colors of the pixels.

In operation 711, the electronic device (for example, the processor 120) may superimpose the text received from the external electronic device on at least part of the preview image, based on the calibrated display position of the text, the text color, and the background color. For example, when a text corresponding to the second partial image 662 of FIG. 6 and translated into a different language is received at a first time, the processor 120 may control to display texts translated into a different language, " 사과 " (apple in Korean language) and " 버터 " (butter in Korean language) 820, on a region corresponding to the corresponding texts in the preview image 810 through the display device 160, as shown in FIG. 8A. When a text corresponding to the first partial image 660 of FIG. 6 and translated into the different language is received at a second time, the processor 120 may compare the reliability of the text corresponding to the first partial image 660 and the reliability of the text corresponding to the second partial image 662, and may select the text (" 바나나 )" (banana in Korean language)) corresponding to the first partial image 660. For example, when the text corresponding to the first partial image 660 is selected, the processor 120 may control display texts translated into the different language, " 사과 " (apple in Korean language) and " 바나나 " (banana in Korean language) 830, on the region corresponding to the corresponding texts in the preview image 810, through the display device 160, as shown in FIG. 8B. When a text corresponding to the entire image 620 of FIG. 6 and translated into the different language is received at a third time, the processor 120 may control to display texts translated into the different language, " 사과 " (apple in Korean language), " 바나나 " (banana in Korean language), and " 바나나 " (carrot in Korean language) 840, on the region corresponding to the corresponding texts in the preview image 810, through the display device 160, as shown in FIG. 8C. For example, when the position of the external object included in the first image obtained through the camera 180 is changed (850) as shown in FIG. 8D, the processor 120 may control to display the texts translated into the different language, " 사과 " (apple in Korean language), " 바나나 " (banana in Korean language), and "당근" (carrot in Korean language) 860, on the display position which is calibrated based on the motion information of the electronic device 101 or the external object included in the first image, through the display device 160, as shown in FIG. 8E.

According to an embodiment, the electronic device 101 (for example, the processor 120) may set a language for translating the text extracted from the first image. For example, when an input (for example, a touch input) on the language 652 for translating the text displayed on the preview image 620 of FIG. 6 is detected, the processor 120 may control to display a list of available languages for translation 870 through the display device 160 as shown in FIG. 8F. The processor 120 may set a language selected from the list of available languages 870 as the language for translation of the text extracted from the first image. As noted above, the disclosure is not limited to language translation. In certain embodiments, instead of listing languages 870, the user can select whether the corresponding text is synonyms, updated information, or any variety of different corresponding relationships.

According to an embodiment, the electronic device 101 (for example, the processor 120) may identify a text included in an image through a first external electronic device (for example, a first server), and may translate the text included in the image into a text of a different language through a second external electronic device (for example, a second server). For example, the processor 120 may control to transmit at least one partial image and an entire image of a preview image to the first external electronic device through the communication module 190. When a text extracted from the image and corresponding to a first language is received from the first external electronic device, the processor 120 may control to transmit the text corresponding to the first language to the second external electronic device through the communication module 190. The processor 120 may control to display the text translated into a second language, which is received from the second external electronic device, through the display device 160, by compensating for a motion difference of the external object included in the first image, as in operations 705 to 711. For example, the processor 120 may calibrate the text corresponding to the first language while the text corresponding to the first language is transmitted to the second external electronic device, and is translated into the text corresponding to the second language (operation 701). As noted above, the disclosure is not limited to language translation and can include a variety of other relationships such as synonyms and updates to name a few.

Figure 9:
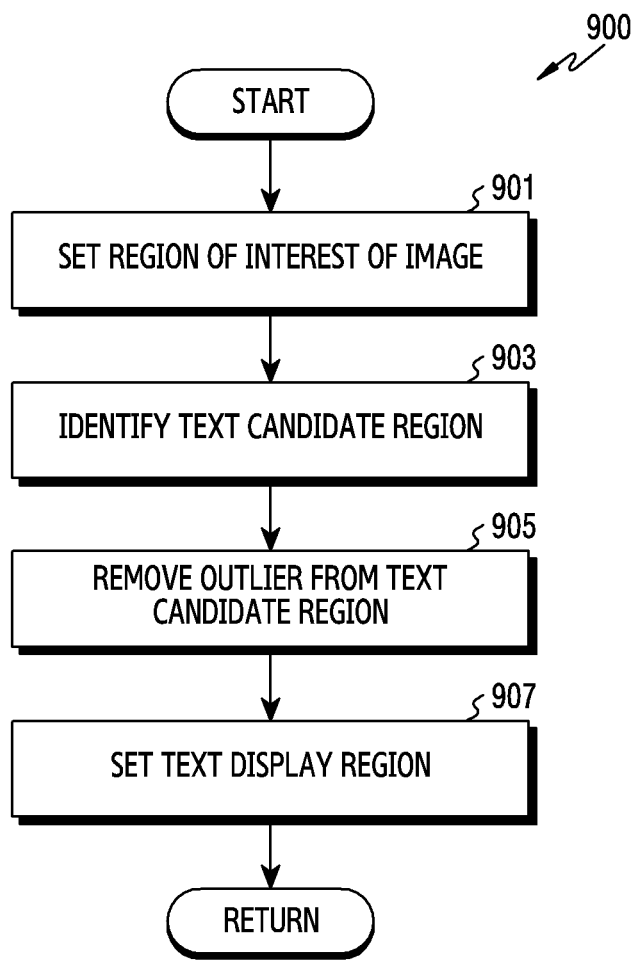
FIG. 9 is a flowchart for setting a display position of a translated text in an electronic device according to certain embodiments of the disclosure.
Figures 10A, 10B, 10C:
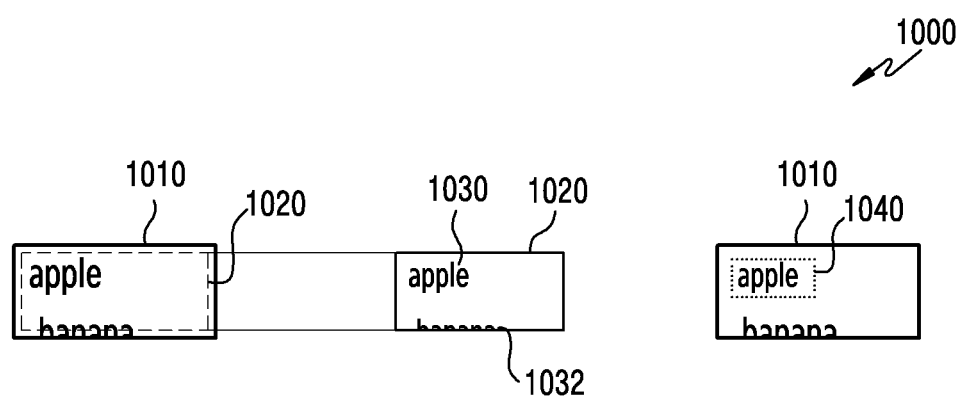
FIG. 10A is a view illustrating a configuration for setting a display position of a translated text in an external electronic device according to certain embodiments of the disclosure.
FIG. 10B is a view illustrating the configuration for setting the display position of the translated text in the external electronic device according to certain embodiments of the disclosure.
FIG. 10C is a view illustrating the configuration for setting the display position of the translated text in the external electronic device according to certain embodiments of the disclosure.

FIG. 9 is a flowchart 900 for setting a display position of a translated or a corresponding text in an electronic device according to certain embodiments of the disclosure. FIG. 10A illustrates a configuration 1000 for setting a display position of a translated text in an external electronic device according to certain embodiments of the disclosure, FIG. 10B illustrates the configuration 1000 for setting the display position of the translated text in the external electronic device according to certain embodiments of the disclosure, and FIG. 10C illustrates the configuration 1000 for setting the display position of the translated text in the external electronic device according to certain embodiments of the disclosure. The following description may be about an operation of calibrating a text received from an external electronic device in operation 701 of FIG. 7. In the following description, the electronic device may include the electronic device 101 of FIG. 1 or at least part (for example, the processor 120) of the electronic device 101.

Referring to FIG. 9, when a text corresponding to an image is received from an external electronic device (for example, "Yes" in operation 307 of FIG. 3), the electronic device (for example, the processor 120) may set at least part of the image corresponding to the text received from the external electronic device as a region of interest in operation 901. For example, the processor 120 may identify region information of the text received from the external electronic device through the communication module 190. For example, the region information of the text may include at least one of a position, a size, and a length of the text extracted from the image. The processor 120 may set at least part of the image corresponding to the text received from the external electronic device as the region of interest, based on the region information of the text received from the external electronic device. For example, the processor 120 may set at least part of a partial image 1010 as a region of interest 1020 as shown in FIG. 10A. For example, the region of interest may be set to be larger than or smaller than the region information of the text received from the external electronic device in the image.

In operation 903, the electronic device (for example, the processor 120) may identify a candidate region for displaying the text within the region of interest. For example, the processor 120 may set pixels having the same brightness or color attribute in the region of interest 1020 within the partial image 1010 as text candidate regions 1030 and 1032 as shown in FIG. 10B. For example, the processor 120 may set the text candidate regions 1030 and 1032 through an algorithm for finding a region in which a change in a binary-coded threshold value is stable (for example, maximally stable extremal regions (MSER)), from among pixels which are relatively brighter or darker than surroundings within the region of interest 1020 of FIG. 10B.

In operation 905, the electronic device (for example, the processor 120) may remove surrounding pixels that are too far removed from the text candidate regions. For example, the processor 120 may remove the outlier which is unnecessary for surrounding the text, based on at least one of a position, a size, or a length of the text candidate region. For example, the processor 120 may recognize the second text candidate region 1032 positioned on the border of the region of interest 1020 as the outlier as shown in FIG. 10B, and may remove the same from the text candidate regions.

In operation 907, the electronic device (for example, the processor 120) may set the text candidate region from which the outlier is removed as a text display region for displaying the text within the image. For example, when the second text candidate region 1032 positioned on the border of the region of interest 1020 is recognized as the outlier and is removed, the processor 120 may set the first text candidate region 1030 as a text display region 1040 within the partial image 1010 as shown in FIG. 10C. For example, the text display region may indicate a region in which the text of the first language extracted from the image is translated into the second language and displayed, or otherwise replace the text.

Figure 11:
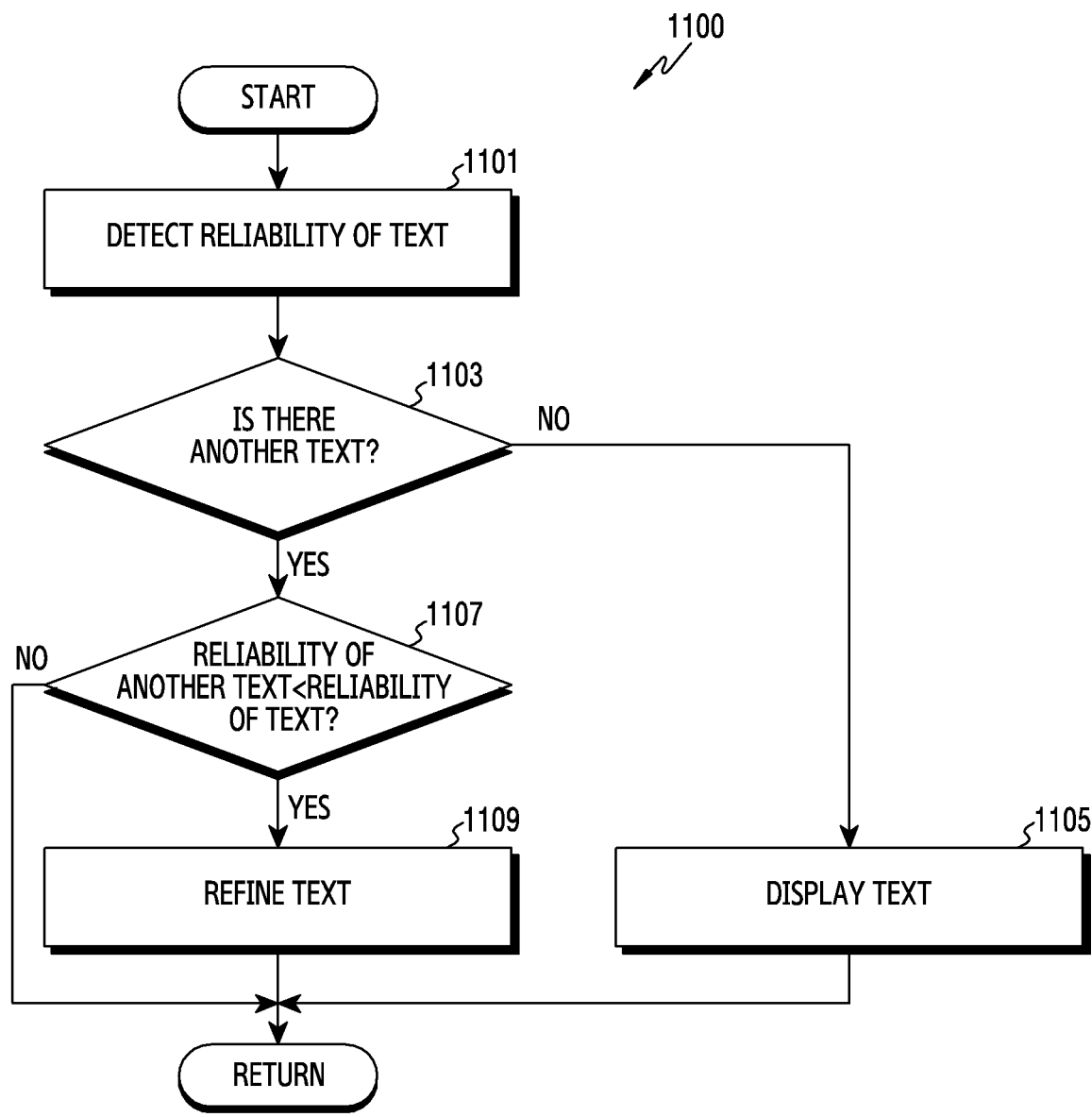
FIG. 11 is a flowchart for displaying a translated text corresponding to a partial image in an electronic device according to certain embodiments of the disclosure.

FIG. 11 is a flowchart 1100 for displaying a translated text corresponding to a partial image in an electronic device according to certain embodiments of the disclosure. The following description may be about an operation of refining the result of a translation service in operations 703 and 705 of FIG. 7. In the following description, the electronic device may include the electronic device 101 of FIG. 1 or at least part (for example, the processor 120) of the electronic device 101.

Referring to FIG. 11, when a text corresponding to an image (for example, a partial image or an entire image) received from an external electronic device is calibrated, the electronic device (for example, the processor 120) may detect a reliability of the corresponding text in operation 1101. For example, the processor 120 may detect the reliability of the corresponding text based on at least one of a position of the text received from the external electronic device in the image (for example, the partial image or entire image), or an accuracy of the text. For example, in the case of the first partial image 660 of FIG. 6, as the text "banana" in the first partial image 660 is closer to the center of the first partial image 660, the processor 120 may determine that the text has a relatively higher reliability. For example, in the case of the second partial image 662 of FIG. 6, the processor 120 may detect the reliability of each of the texts "apple" and "banana" based on the positions of the texts in the second partial image 662. In this case, it may be determined that the reliability of the text "apple" is higher than the reliability of the text "banana" based on their positions in the second partial image 662. For example, the accuracy of the text may be determined based on whether the text is mapped onto a text of a specific language.

In operation 1103, the electronic device (for example, the processor 120) may determine whether there exists another text received from the external electronic device at a previous time in a region for displaying the text received from the external electronic device in the first image (preview image). For example, the processor 120 may determine whether there exists a text corresponding to another image (for example, a partial image or entire image) received from the external electronic device at a previous time. When there exists a text corresponding to another image received from the external electronic device at a previous time, the processor 120 may determine whether a display region of the text corresponding to another image in the first image (preview image) overlaps at least part of the display region of the text the reliability of which is detected in operation 1101. For example, when there is no text corresponding to another image received from the external electronic device at the previous time or the display region of the text of another image does not overlap at least part of the display region of the text in the first image, the processor 120 may determine that another text does not exist in the region for displaying the text received from the external electronic device in the first image. For example, when the display region of the text corresponding to another image, received from the external electronic device at the previous time, in the first image, overlaps at least part of the display region of the text, the processor 120 may determine that another text exists in the region for displaying the text received from the external electronic device in the first image.

When there is no text corresponding to another image in the region for displaying the text received from the external electronic device in the first image (preview image) (for example, "No" in operation 1103), the electronic device (for example, the processor 120) may display the text received from the external electronic device on the region for displaying the text received from the external electronic device in the entire image in operation 1105. For example, the processor 120 may render the image to display the text translated into a different language, which is received from the external electronic device, on a text display region in the preview image set through operations 901 to 907. For example, when the text (text translated into a different language) corresponding to the second partial image 662 of FIG. 6 is received at a first time, the processor 120 may render the preview image to display the texts translated into the different language, "사과" (apple in Korean language) and "버터" (butter in Korean language) 820, on the display region of the texts corresponding to the second partial image 662 in the preview image 810, as shown in FIG. 8A.

When there exists the text corresponding to another image in the region for displaying the text received from the external electronic device in the first image (preview image) (for example, "Yes" in operation 1103), the electronic device (for example, the processor 120) may determine whether the reliability of the text received from the external electronic device is higher than the reliability of another text in operation 1107. For example, when the text (text translated into the different language) corresponding to the first partial image 660 of FIG. 6 is received at a second time, the processor 120 may compare the reliability of the text ("바나나" (banana in Korean language)) corresponding to the first partial image 660 and the text ("버터" (butter in Korean language)) corresponding to the second partial image 662. For example, since the text ("바나나" (banana in Korean language)) corresponding to the first partial image 660 is positioned on the center of the image of the first partial image 660, the text may have the reliability relatively higher than that of the text ("버터" (butter in Korean language)) corresponding to the second partial image 662, which is positioned on the border of the second partial image 662.

When the reliability of the text received from the external electronic device is higher than the reliability of the text corresponding to another image (for example, "Yes" in operation 1107), the electronic device (for example, the processor 120) may refine the text of the text display region into the text received from the external electronic device in operation 1109. For example, when it is determined that the reliability of the text ("바나나" (banana in Korean language)) corresponding to the first partial image 660 is high, the processor 120 may render the preview image to refine the text "버터" (butter in Korean language) of the preview image 810 displayed through the display device 160 as shown in FIG. 8A into the text "바나나" (banana in Korean language) as shown in FIG. 8B, and to display the refined text.

When the reliability of the text received from the external electronic device is lower than or equal to the reliability of another text (for example, "No" in operation 1107), the electronic device (for example, the processor 120) may maintain the text corresponding to another image, which is displayed on the text display region of the first image (preview image).

According to an embodiment, when the text of the first display region received at the first time is the same as the text of the first display region received at the second time, the electronic device 101 (for example, the processor 120) may maintain the text displayed on the first display region in the preview image. For example, when the text of the first display region received at the first time is the same as the text of the first display region received at the second time, operations 1107 to 1109 may be omitted.

According to an embodiment, the electronic device 101 (for example, the processor 120) may continuously collect motion information of the electronic device 101 or the external object included in the first image from the time that the first image is obtained through the camera 180. The electronic device 101 may finish the translation service before the translation service is completed, based on the motion information of the electronic device 101 or the external object included in the first image. For example, when the motion of the electronic device 101 or the external object included in the first image falls outs of a reference range, the processor 120 may determine that it is not possible to display the text translated into the different language. Accordingly, the processor 120 may stop the translation service.

The electronic device and the operating method thereof according to certain embodiments transmit an image obtained through the camera to an external electronic device (for example, a server), calibrate a display position of a text translated, which is received from the external electronic device, or compensate for a difference between the image transmitted to the external electronic device (for example, the server) for the translation service, and the image displayed on the display, and display the translated text. Therefore, the text translated through the external electronic device may be smoothly displayed on the image obtained through the camera.

The electronic device and the operating method thereof according to certain embodiments selectively transmit an image for a translation service to an external electronic device (for example, a server), based on at least one of quality (for example, a distribution of feature points) of the image obtained through the camera or motion information of the electronic device. Therefore, the number of times of translation using the external electronic device can be reduced and thus consumption of network resources can be reduced.

The electronic device and the operating method according to certain embodiments transmit at least one partial image and an entire image corresponding to an image obtained through the camera to an external electronic device (for example, a server). Therefore, a translation delay in a network and a delay in a translation service caused by calculation by an external electronic device can be reduced.

Certain embodiments of the present disclosure may be implemented by software including instructions which are stored in machine (e.g., computer)-readable storage medium (e.g., the memory 130, FIG. 1). The machine is a device that is capable of retrieving a stored instruction from a storage medium, and operates according to the retrieved instruction, and may include the electronic device 100, 102, 104 or the server 108. When the instruction is executed by a processor (e.g., the processor 120), the processor may directly perform a function corresponding to the instruction, or may perform the function corresponding to the instruction using other elements under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

The method according to certain embodiments disclosed herein may be included and provided in a computer program product. The computer program product may be traded as a product between a seller and a buyer. For example, a computer program product may be a downloadable application or computer program which is traded between a seller and a purchaser. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to certain embodiments may include a single entity or multiple entities, and in certain embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to certain embodiments may be executed sequentially, in parallel, repeatedly, or in a heuristic manner. At least some operations may be executed according to another sequence, may be omitted, or may further include other operations.

The disclosure has been described with reference to various example embodiments thereof. It will be understood by a person skilled in the art that the disclosure can be implemented in modified forms without departing from the essential characteristics of the disclosure. Therefore, disclosed embodiments should be considered from a descriptive perspective, not from a limited perspective. The scope of the disclosure is defined not by the detailed description but by the appended claims, and all differences within the scope should be understood as being included in the disclosure.

What is claimed is:

1. An electronic device comprising:
   a camera;
   a display;
   a communication circuitry; and
   one or more processors, wherein the one or more processors is configured to:
   display, via the display, a preview screen that includes one or more images obtained using the camera;
   while the preview screen being displayed via the display:
   display a first image including a first object in the preview screen;
   identify that the first object includes a first text in a first language,
   transmit, via the communication circuitry to a server, at least part of the first image,
   receive, via the communication circuitry from the server, a second text where the first text is translated into a second language by the server;
   obtain motion information related to a motion of the electronic device or a motion of the first object,
   if the motion information falls within a reference range, display a second image in the preview screen, wherein the second image is an image where the first text is replaced with the second text or the second text is overlapped on the first object, and
   if the motion information falls out of the reference range, stop translation so that display of the first image with the first text before translation is maintained in the preview screen.

2. The electronic device of claim 1, wherein the one or more processors is further configured to:
   detect a motion of the electronic device which is generated during a time that the at least part of the first image is transmitted to the server and the second text is received from the server with at least one sensor; and display the second image with the second text by compensating for the motion.

3. The electronic device of claim 1, wherein the one or more processors is further configured to:
receive region information corresponding to the second text from the server, and set a region of interest in the first image based on the received region information;
detect a candidate region comprising pixels which are similar in terms of at least one attribute of a brightness or color, based at least on a comparison between pixels included in the region of interest or a region adjacent to the region of interest; and
calibrate the region information based on the candidate region.

4. The electronic device of claim 3, wherein the one or more processors is configured to:
determine an additional attribute related to the second text, based on at least some region of the first image corresponding to the calibrated region information; and
display the second image with the second text based on the additional attribute, and
wherein the additional attribute comprises at least one of color, a size, or a font of text, or a background color.

5. The electronic device of claim 1, wherein the one or more processors is configured to:
when a plurality of corresponding texts is received, compare reliability between the plurality of corresponding texts, and
display any one of the plurality of corresponding texts selected based on a result of a comparison as the second text.

6. The electronic device of claim 5, wherein the one or more processors is configured to detect the reliability of the plurality of corresponding texts based on a position of the plurality of corresponding texts in the first image.

7. The electronic device of claim 1, wherein the one or more processors is further configured to:
if the motion information falls out of the reference range, display, via the display, a guidance message indicating that a translation service for the first image is restricted.

8. The electronic device of claim 1, wherein the one or more processors further is configured to:
detect, via at least one sensor of the electronic device, the motion of the electronic device; or
detect, using the camera, the motion of the first object including the first text in the first language.

9. The electronic device of claim 1, wherein displaying the second image further comprises:
determining at least a part of the second image based on the at least part of the first image and the motion information;
identifying a region of the at least the part of the second image having pixels with substantially same pixel values; and
displaying the second text in the region having the pixels with substantially the same pixel values.

10. The electronic device of claim 1, wherein displaying the second image further comprises:
identifying a region of that least the part of the first image having pixels with substantially same pixel values;
identifying a corresponding region in the second image, based on the motion information; and
displaying the second text in the corresponding region in the second image.

11. A method in an electronic device, the method comprising:
displaying, via a display of the electronic device, a preview screen that includes one or more images obtained using a camera of the electronic device;
while the preview screen being displayed via the display:
displaying a first image including a first object in the preview screen;
identifying that the first object includes a first text in a first language,
transmitting, via a communication circuitry of the electronic device, at least part of the first image to a server, and
receiving, from the server via the communication circuitry, a second text where the first text is translated into a second language by the server;
obtaining motion information related to a motion of the electronic device or a motion of the first object,
if the motion information falls within a reference range, displaying a second image in the preview screen, wherein the second image is an image where the first text is replaced with the second text or the second text is overlapped on the first object, and
if the motion information falls out of the reference range, stopping translation so that display of the first image with the first text before translation is maintained in the preview screen.

12. The method of claim 11, further comprising:
detecting a motion of the electronic device which is generated during a time that the at least part of the first image is transmitted to the server and the second text is received from the server with an acceleration sensor or a gravity sensor; and
displaying the second image with the second text by compensating for the motion.

13. The method of claim 11, further comprising:
receiving region information corresponding to the second text from the server, and setting a region of interest in the first image based on the received region information;
detecting a candidate region comprising pixels which are similar in terms of at least one attribute of a brightness or color, based at least on a comparison between pixels included in the region of interest or a region adjacent to the region of interest; and
calibrating the region information based on the candidate region.

14. The method of claim 13, further comprising:
determining an additional attribute related to the second text, based on at least some region of the first image corresponding to the calibrated region information,
wherein the displaying comprises displaying the second image with the second text based on the additional attribute, and
wherein the additional attribute comprises at least one of color, a size, or a font of text, or a background color.

15. The method of claim 11, wherein displaying the second image comprises:
when a plurality of corresponding texts is received, comparing reliability between the plurality of corresponding texts; and
displaying any one of the plurality of corresponding texts selected based on a result of a comparison as the second text.

16. The method of claim 15, wherein the reliability of the plurality of corresponding texts is set based on a position of the plurality of corresponding texts in the first image.

17. The method of claim 11, further comprising:
if the motion information falls out of the reference range, displaying, via the display, a guidance message indicating that a translation service for the first image is restricted.

18. The method of claim 11, obtaining the motion information comprises:
detecting, via at least one sensor of the electronic device, the motion of the electronic device; or
detecting, using the camera, the motion of the first object including the first text in the first language.

\* \* \* \* \*